US012803019B2

(12) United States Patent
Kulikovsky

(10) Patent No.: US 12,803,019 B2
(45) Date of Patent: Nov. 17, 2026

(54) LOCATING DEGRADED CELLS IN A POLYMER ELECTROLYTE MEMBRANE FUEL CELL STACK

(71) Applicant: Andrei Kulikovsky, Nideggen (DE)

(72) Inventor: Andrei Kulikovsky, Nideggen (DE)

( * ) Notice: Subject to any disclaimer, the term of this patent is extended or adjusted under 35 U.S.C. 154(b) by 855 days.

(21) Appl. No.: 18/129,509

(22) Filed: Mar. 31, 2023

(65) Prior Publication Data

US 2023/0317991 A1 Oct. 5, 2023

Related U.S. Application Data

(60) Provisional application No. 63/372,772, filed on Apr. 5, 2022.

(51) Int. Cl.

*H01M 8/04537* (2016.01)
*H01M 8/04303* (2016.01)
*H01M 8/0438* (2016.01)
*H01M 8/2484* (2016.01)

(52) U.S. Cl.

CPC ... *H01M 8/04619* (2013.01); *H01M 8/04303* (2016.02); *H01M 8/0438* (2013.01); *H01M 8/04589* (2013.01); *H01M 8/2484* (2016.02)

(58) Field of Classification Search

CPC ......... H01M 8/04559; H01M 8/04589; H01M 8/04649; H01M 8/04671

See application file for complete search history.

(56) References Cited

U.S. PATENT DOCUMENTS

2009/0029213 A1* 1/2009 Murakami ............ H01M 8/043 429/421
2018/0277866 A1* 9/2018 Kreitmeier ........ H01M 8/04246

OTHER PUBLICATIONS

Chang, et al., "Flow distribution in proton exchange membrane fuel cell stacks", Journal of Power Sources, vol. 162, 2006, pp. 340-355.
Selvaganesh et al., "Durable electrocatalytic-activity of Pt-AU/C cathode in PEMFCs", Phys. Chem. Chem. Phys., 2011, 13, pp. 12623-12634.

* cited by examiner

*Primary Examiner* — Brittany L Raymond
(74) *Attorney, Agent, or Firm* — Lee & Hayes, P.C.

(57) ABSTRACT

Novel methods and apparatus for identifying one or more degraded cells in a fuel cell stack wherein one or more, but not the entirety of, the fuel cells in the stack are turned off while maintaining constant current in the external load and the resulting stack potential is measured.

16 Claims, 5 Drawing Sheets

LOCATING DEGRADED CELLS IN A POLYMER ELECTROLYTE MEMBRANE FUEL CELL STACK

CROSS-REFERENCE TO RELATED APPLICATIONS

The following application claims benefit of U.S. Provisional Application No. 63/372,772, filed Apr. 5, 2022 which is hereby incorporated by reference in its entirety.

BACKGROUND

Polymer electrolyte membrane (PEM) fuel cells are electrochemical power sources that convert the chemical energy of reactants (hydrogen and oxygen) directly into electric current. Hydrogen supplied to the cell anode is converted to protons and electrons. Protons move to the cell cathode through an ion conducting polymer membrane, while electrons arrive at the cathode through an external circuit. On the cell cathode, protons, electrons and oxygen participate in the oxygen reduction reaction, which produces water.

To increase output power, a plurality of individual cells are assembled in a stack. A typical automotive PEMFC stack includes up to a hundred (or more) cells delivering typically 50 to 100 kW of electric power. However, over time, the performance of some of the cells in a stack may degrade, resulting in reduced stack performance. One of the key problems in stack testing is locating degraded (poorly performing) cells. Accordingly, the current standard is to ignore reduced performance due to degraded individual cells until the overall performance of the stack is low enough to warrant replacement of the entire stack. This results in inefficiencies related both to tolerating a cell stack that has reduced performance and requiring the replacement of well-performing cells within the stack. Accordingly, a simple method for identifying degraded cell(s) in the stack would be highly desirable, as such a method would enable the replacement of only the degraded cells rather than the entire stack in order to recover the stack power.

SUMMARY

The present disclosure provides novel methods and apparatus for identifying one or more degraded cells in a fuel cell stack. According to an embodiment, the method comprises turning off one or more cells in the fuel stack and detecting the resulting stack potential. According to a more specific embodiment, turning off a cell in a fuel cell may comprise blocking the air inlet to the cell. According to another embodiment, the disclosure provides for a fuel cell stack wherein individual cells can be turned off. According to a more specific embodiment, the present disclosure provides a fuel cell stack wherein the individual air inlets of fuel cells can be blocked for testing.

DETAILED DESCRIPTION

Figure 1:
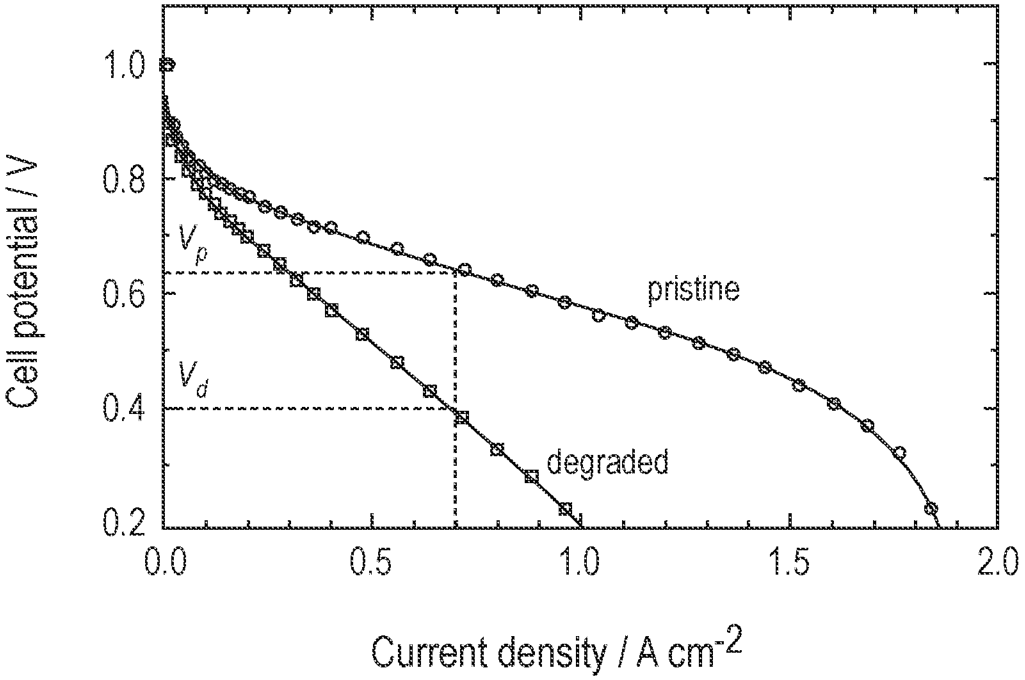
FIG. 1 is a graph depicting exemplary polarization curves of pristine and degraded cells.

According to an embodiment the present disclosure provides methods and apparatus that enable the identification degraded cells in a fuel cell stack. The herein disclosed methods and apparatus rely on the fact that there is a detectable difference in the cell potential produced by a pristine cell compared to a degraded cell. In a fuel cell stack, mean current density through all the cells is the same, while the stack potential is a sum of individual cell potentials. (See, e.g., P. Chang, J. St-Pierre, J. Stumper, B. Wetton. *Flow distribution in proton exchange membrane fuel cell stacks*. J. Power Sources, 2006 (162) 340-355, doi:10.1016/j.jpowsour.2006.06.081, which is hereby incorporated by reference for all purposes.) A fuel cell polarization curve shows the dependence of cell potential on current density produced by a cell in the external load. Exemplary polarization curves of pristine and degraded cells are shown in FIG. 1 (data from S. V. Selvaganesh, G. Selvarani, P. Sridhar, S. Pitchumani, A. K. Shukla. Durable electrocatalytic-activity of Pt—Au/C cathode in PEMFCs. Phys. Chem. Chem. Phys. 2011 (13) 12623-1263, doi: 10.1039/C1CP20243J, which is hereby incorporated by reference for all purposes.) In viewing FIG. 1, it can be seen that if, for example, pristine and degraded cells operate at a current density of around 0.7 A $cm^{-2}$, the pristine cell potential is about $V_p \cong 0.65$V, while the degraded cell potential is about $V_d \approx 0.4$V.

Suppose that all the cells in a stack except one have pristine polarization curves, while a single degraded cell exhibits a degraded polarization curve (FIG. 1). If the stack is operated at the current density of 0.7 A $cm^{-2}$, the contribution of each pristine cell to the overall stack potential would be about 0.65 V, while the contribution of degraded cell to the stack potential is only about 0.4 V (FIG. 1). Thus, switching off the cells one-by-one and monitoring the respective change of stack potential enables the identification of the degraded cell as the stack potential reduction produced by switching off a pristine cell is detectably larger than the stack potential reduction produced by switching off a degraded cell. In the example above, switching off a pristine cell would lower the stack potential by 0.65 V, while switching off a degraded cell would lower the stack potential by 0.4 V. The difference of 0.25 V is quite significant, and it can easily be detected using a standard voltmeter.

Figure 2A:
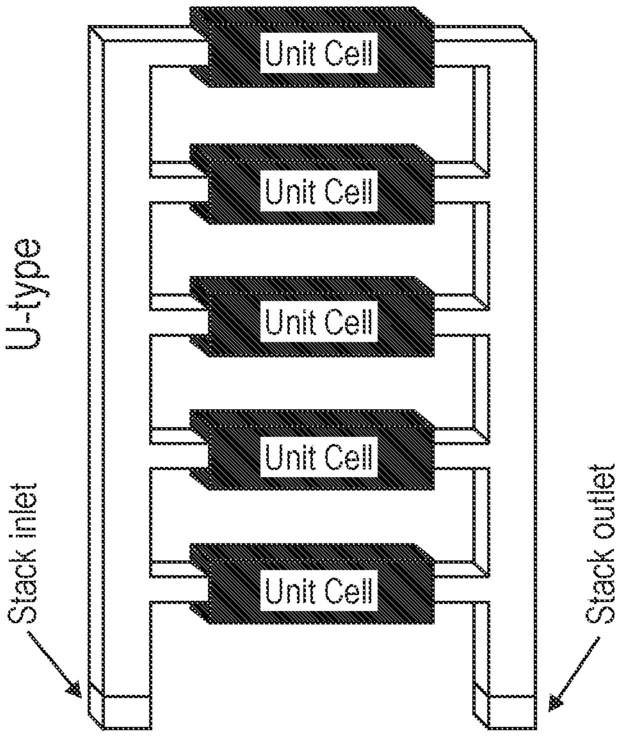
FIG. 2A shows an exemplary U-type manifold as typically seen in Polymer Electrolyte Membrane (PEM) fuel cells.
Figure 2B:
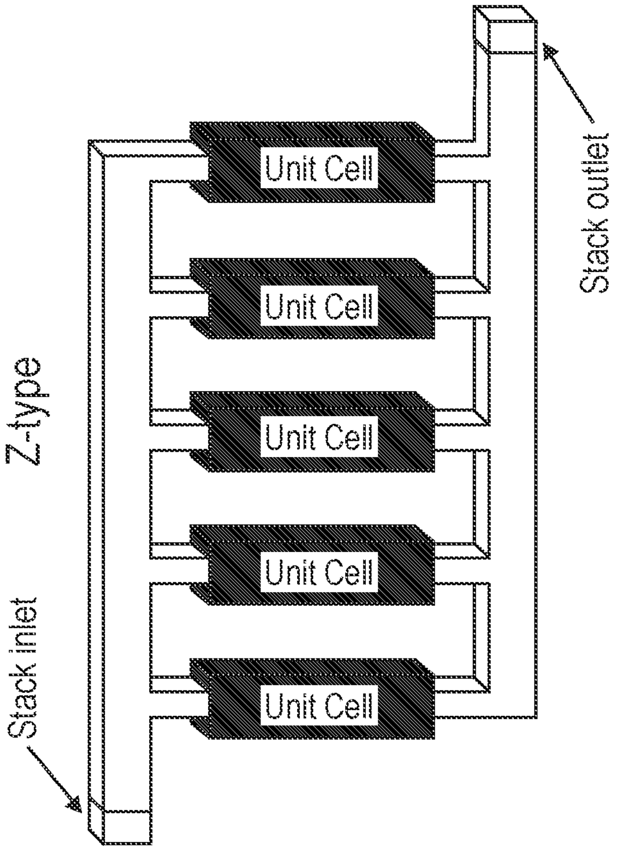
FIG. 2B shows an exemplary Z-type manifold as typically seen in Polymer Electrolyte Membrane (PEM) fuel cells.

According to an embodiment, an individual cell may be switched "off" by cutting off the oxygen supply to that particular cell. In a typical PEM fuel cell, oxygen supply to and removal of product water from the stack is performed through a manifold which comprises of inlet and outlet headers of large diameter. Either a U- or Z-type manifold could be used (FIGS. 2A and 2B). In the U-type (FIG. 2A), the oxygen inlet and outlet are located on the same side of the stack, while in the Z-type (FIG. 2B), inlet and outlet are on the opposite sides. The method for switching off individual cells discussed below is valid for both manifold types.

Figure 3:
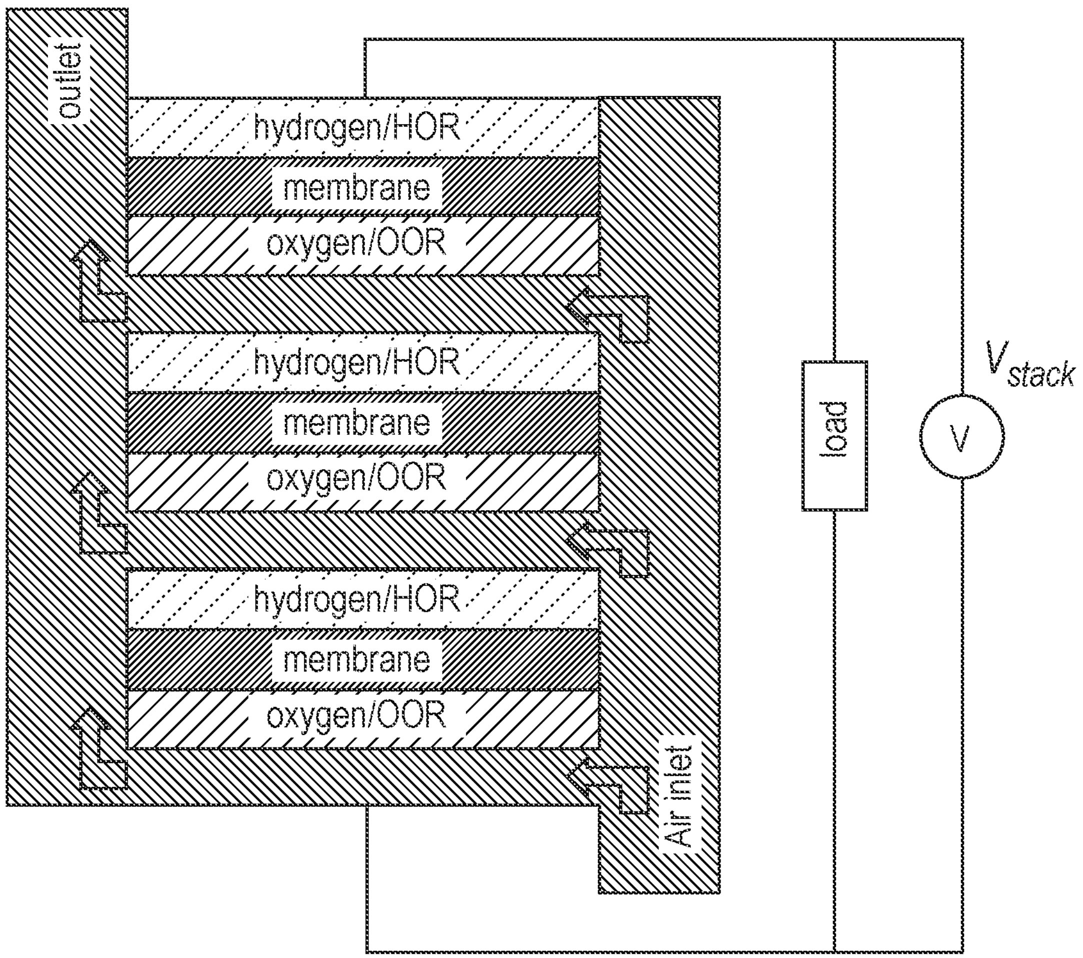
FIG. 3 depicts an exemplary 3-cell stack with a Z-type manifold.

FIG. 3 depicts an exemplary 3-cell stack with a Z-type manifold. Under normal operating conditions the cathodes of all the three cells are fed with oxygen (air) and the oxygen reduction reaction (ORR) runs on these electrodes. The anodes fed with hydrogen convert it into protons and electrons in the hydrogen oxidation reaction (HOR). In each cell, the anode and cathode are separated by a membrane which is impermeable to oxygen and hydrogen. The membrane transports protons from the anode to the cathode.

Figure 4:
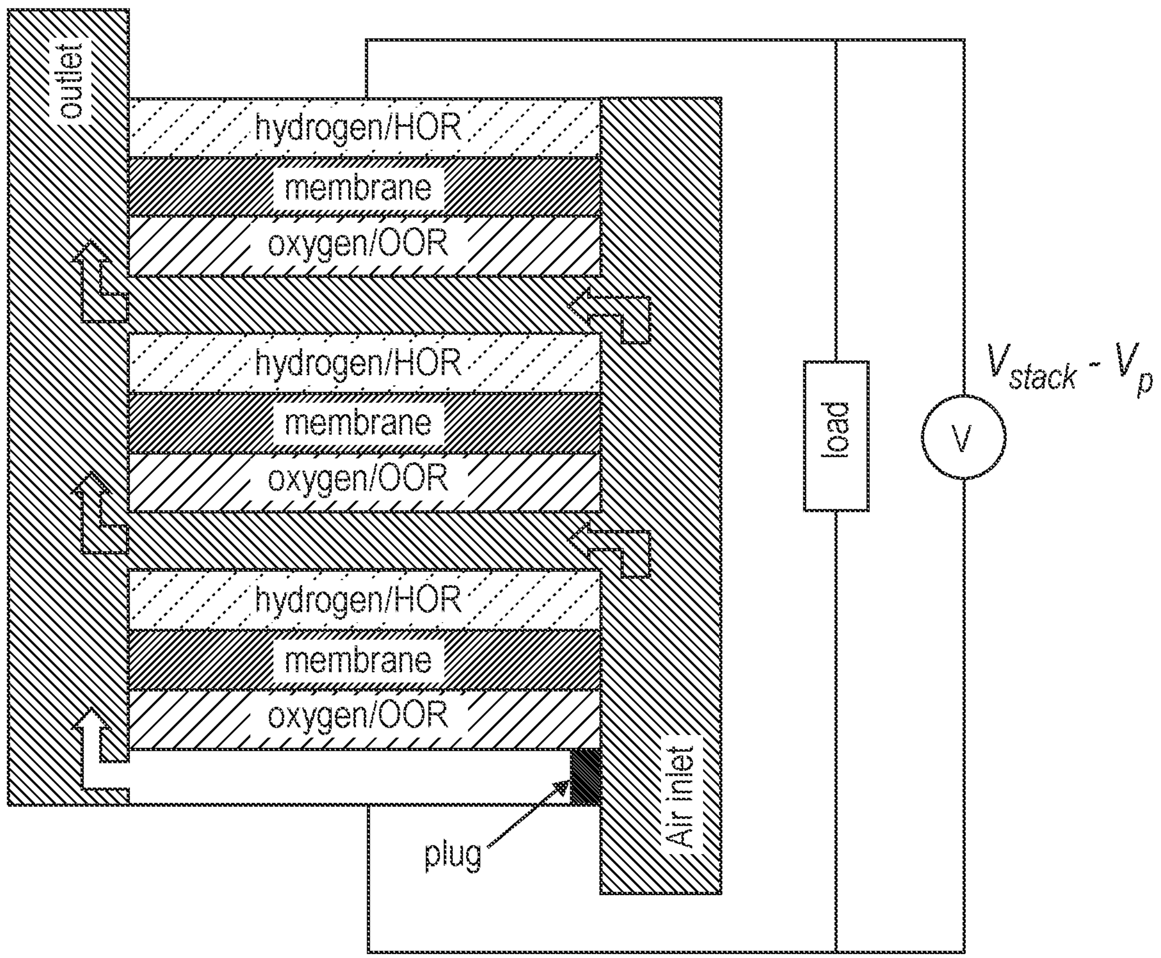
FIG. 4 depicts the 3-cell stack of FIG. 3 where the air inlet of the pristine bottom cell is blocked.

However, turning to FIG. 4, if the inlet of oxygen channel of the bottom cell is closed, for example by a plug, the absence of oxygen in the bottom cell cathode initiates the hydrogen evolution reaction (HER) there. In the bottom cell cathode, protons coming from the anode meet electrons and HER transform charged species into gaseous hydrogen. Since both HOR and HER require only a small voltage to run (about 10 mV per each 2 reaction), the bottom cell potential drops down to negligible value of about 20 mV. Thus, if this cell is a pristine one, the stack potential decreases by the value of $V_p \cong 0.65$V.

Figure 5:
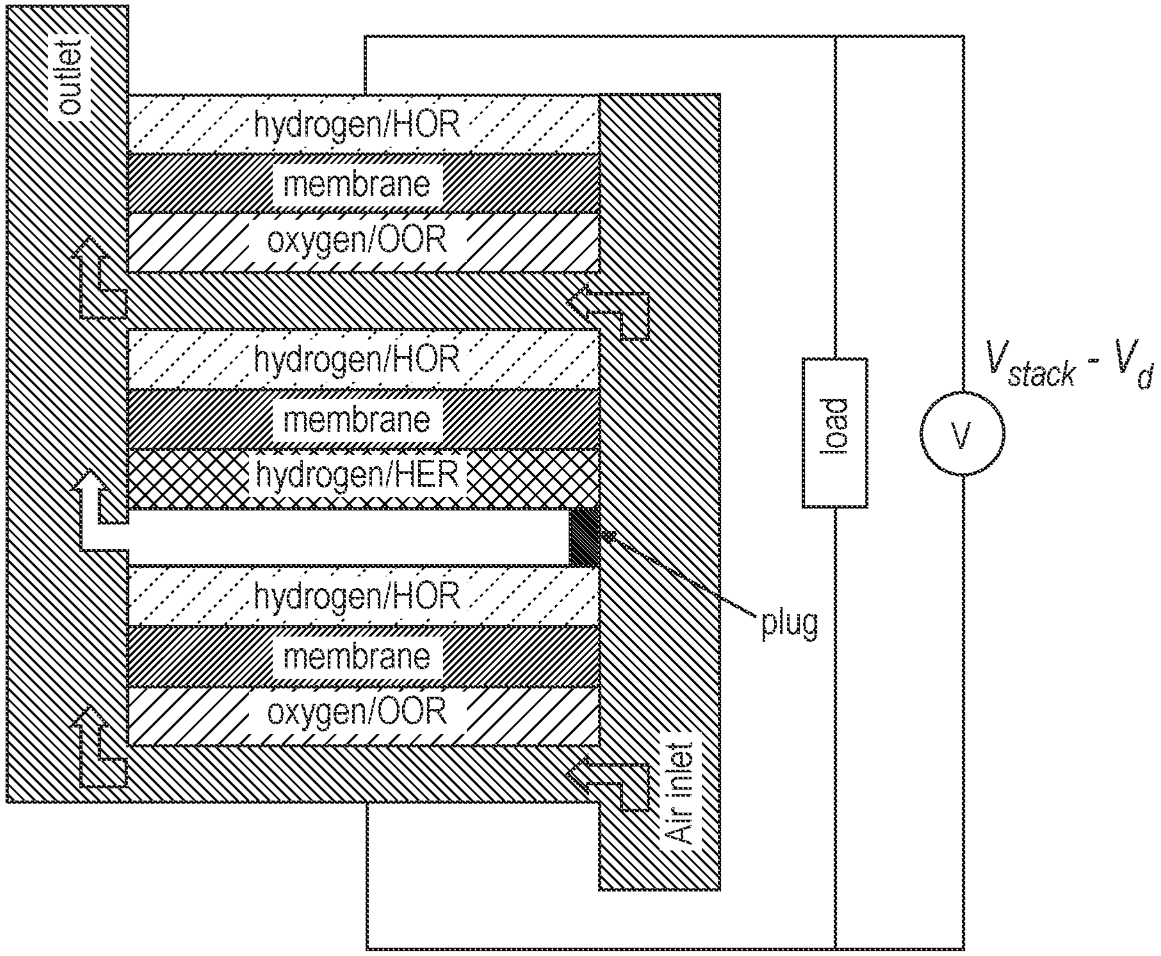
FIG. 5 depicts the 3-cell stack of FIG. 3 where the air inlet of the degraded middle cell is blocked.

Suppose now that the second (middle) cell is the degraded one. FIG. 5 shows what happens when the oxygen inlet to this cell is blocked. Now the middle cell cathode becomes a hydrogen-evolving electrode. However, the stack potential drops by the value of degraded cell potential $V_d \cong 0.4$V. The difference with the voltage drop due to switching off a pristine cell is quite noticeable, and one can identify the middle cell as a degraded one.

It should be noted that while the above example provides an expected stack potential decrease of ≅0.65V when the switched off cell is a pristine or "good" cell, a degraded cell can be identified simply by detecting a reduced stack potential decrease in comparison to other cells in the same stack. Accordingly, it may not be necessary to strictly identify (or provide to the user) the numerical value of the potential decrease, but rather it may be sufficient to simply indicate to the user those cells wherein the potential decrease was substantially less than the potential decrease of other cells within the stack.

It should be understood that the potential drop realized by switching off a degraded cell will depend on the stack current density. Accordingly, while the above example provides specific numbers, it should be understood that a degraded cell in a stack with a different stack current density may result in a different potential drop than that specified above, but the principle is still the same.

In this way, one may switch off the air flow sequentially in all cells in the stack, one-by-one. Measuring the respective decay in stack potential allows one to locate the degraded cells. Note that in the course of measurements, the current in the external load has to be kept constant.

For safety reasons, air flow at the stack inlet should be selected large enough to keep hydrogen concentration in the outlet header below explosive limit of 18.3%. For example, if the number of cells in a stack exceeds 5, safe conditions are guaranteed if air flow stoichiometry exceeds hydrogen flow stoichiometry.

In general, it should be noted that in most current fuel cell stacks there is no direct access to individual cell electrodes in the stack, which is what makes the presently disclosed method both novel and important.

According to another embodiment, the present disclosure provides a fuel stack wherein each cell has an individual oxygen inlet and each oxygen inlet includes a mechanism for blocking off the oxygen supply to the cell. Examples of suitable mechanisms include mechanical devices such as valves, plugs, or the like. Such devices may be controlled manually, for example via a user-operated switch or button or automatically (for example via a computer). Those of skill in the art will be familiar with various mechanical and electrical mechanisms for operating valves, plugs, or the like and it will be readily apparent that the present disclosure contemplates the use of any such suitable apparatus including any mechanical features, electronic relays, circuits, computer software or hardware, or the like that might be required to shut off oxygen flow to each cell in the stack.

According to a further embodiment, the present disclosure provides a mechanism for measuring the stack potential after the oxygen flow is cut off to each individual cell, correlating the resulting change in stack potential with the cell, and identifying to the user any cell whose performance is identified as degraded as determined by the change in stack potential. For example, the present disclosure contemplates a fuel cell stack which is able to self-diagnose degraded cells where the oxygen flow to each cell can be individually stopped and wherein during a self-diagnosis routine, the oxygen flow to each cell is stopped in order to briefly "turn off" the cell and the stack potential is measured each time a cell is turned off and compared to the expected reduction of stack potential. (In the example above, the expected stack potential decrease was ≅0.65 V.) Cells that produce the expected stack potential decrease can be identified as "good" or "pristine" while those that produce a lower than expected stack potential decrease (i.e. ≅0.4V, in the example above) can be identified as "bad" or "in need of replacement."

According to some embodiments, the individual fuel cells are turned off one-by-one. Such measurement could take place in any order (sequentially, non-sequentially, in a single diagnostic session or during different diagnostic sessions, etc.) so long as the resulting change in stack potential is correlated to the cell which was switched off at the time of the measurement. Alternatively, the same method described above could be applied to groups of cells, allowing for the detection (and possible replacement) of a bad "unit" of cells rather than individual cells. This may be advantageous, for example, in a fuel cell stack comprising a large number of cells (i.e. 50, 70, 100, or more) where testing a large number of individual cells may take too long and/or replacing a single cell might not be deemed cost efficient. In this situation, it may be more time and cost efficient to test groups or units of cells and then swap out units, as deemed necessary or reasonable.

A self-diagnosing fuel cell stack may also include an indicator or user interface which identifies the degraded cells to the user. Such an indicator or user interface could be a simply mechanical feature such as a switch or light that flips, turns on or off, or otherwise changes to indicate the need for replacement. Alternatively, a more complex software-based user interface, such as might run on a computer or portable computing device could be used to indicate the need for replacement. Those of skill in the art will be familiar with various computerized and non-computerized methods for delivering such information to a user and such methods are therefore contemplated by the present disclosure.

It should be noted that while the specific examples above are provided for PEM fuel cells, the presently disclosed methods and apparatus are equally suitable for any direct alcohol fuel cell (DAFC) including, but not limited to direct methanol fuel cells (DMFCs).

The specific methods and compositions described herein are representative of preferred embodiments and are exemplary and not intended as limitations on the scope of the invention. Other objects, aspects, and embodiments will occur to those skilled in the art upon consideration of this specification and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. The methods and processes illustratively described herein suitably may be practiced in differing orders of steps, and that they are not necessarily restricted to the orders of steps indicated herein or in the claims.

Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

What is claimed is:

1. A method for identifying a degraded fuel cell in a fuel cell stack comprising:

measuring a first fuel cell stack potential;

turning off one or more but less than the entirety of individual fuel cells in the fuel cell stack while maintaining constant current in the external load;

measuring a second fuel cell stack potential, a second fuel cell stack potential decrease resulting from turning off the one or more individual fuel cells;

calculating a difference in fuel cell stack potential between the first fuel cell stack potential and the second fuel cell stack potential; and identifying the one or more individual fuel cells where the difference in fuel cell stack potential is less than a highest measured fuel cell stack potential decrease.

2. The method of claim 1 wherein the step of turning off an individual fuel cell comprises blocking an oxygen supply to the one or more individual fuel cells.

3. The method of claim 1 wherein the individual fuel cells of the one or more individual fuel cells are turned off one-by-one and the stack potential is measured after each cell is turned off.

4. The method of claim 1 wherein the step of identifying the one or more individual fuel cells where the difference in fuel cell stack potential is less than the highest measured stack potential decrease comprises producing a signal that is detectable by a user.

5. The method of claim 1 wherein the fuel cell stack comprises a mechanism for blocking air inlets to the one or more individual fuel cells.

6. The method of claim 5 wherein the mechanism is user operated.

7. The method of claim 1 wherein the fuel cell stack comprises a mechanism for measuring the stack potential while maintaining constant current in the external load.

8. A method for identifying a degraded fuel cell in a fuel cell stack comprising:

measuring a first fuel stack potential;

turning off one or more individual fuel cells in the fuel cell stack while maintaining constant current in an external load;

measuring a second fuel stack potential resulting from turning off the one or more individual fuel cell;

calculating a difference between the first fuel stack potential and the second fuel stack potential; and identifying the one or more individual fuel cell as being degraded if the difference in the stack potential is less than an expected stack potential decrease from turning off one or more individual fuel cells.

9. The method of claim 8 wherein the step of turning off an individual fuel cell comprises blocking an oxygen supply to the one or more individual fuel cells.

10. The method of claim 8 wherein the individual fuel cells are turned off one-by-one and the stack potential is measured after each cell is turned off.

11. The method of claim 8 wherein the step of identifying the individual fuel cells wherein the difference in the stack potential is less than the expected stack potential comprises producing a signal that is detectable by a user.

12. The method of claim 8 wherein the fuel cell stack comprises a mechanism for blocking air inlets to the one or more individual fuel cells.

13. The method of claim 12 wherein the mechanism is user operated.

14. The method of claim 8 wherein the fuel cell stack comprises a mechanism for measuring the stack potential while maintain constant current in the external load.

15. A self-diagnosing fuel cell stack comprising:

a plurality of fuel cells wherein each fuel cell can be individually turned off while maintaining constant current in an external load;

a mechanism for measuring stack potential;

a mechanism for turning off each individual fuel cell;

a device for calculating a change in fuel stack potential from measurements obtained at successive time points;

a mechanism for identifying the individual fuel cell as being degraded if a measured stack potential decrease is less than an expected stack potential decrease;

a mechanism for indicating to a user those cells which have been identified as degraded.

16. The self-diagnosing fuel cell stack of claim 15, wherein the fuel cell stack comprises a mechanism for blocking an oxygen supply to each individual cell.

* * * * *